US005255163A

United States Patent [19]

Neumann

[11] Patent Number: 5,255,163

[45] Date of Patent: Oct. 19, 1993

[54] HEADLIGHT FOR MOTOR VEHICLE

[75] Inventor: Rainer Neumann, Stuttgart, Fed. Rep. of Germany

[73] Assignee: Robert Bosch GmbH, Stuttgart, Fed. Rep. of Germany

[21] Appl. No.: 1,806

[22] Filed: Jan. 8, 1993

[30] Foreign Application Priority Data

Feb. 1, 1992 [DE] Fed. Rep. of Germany ....... 4202872

[51] Int. Cl.[5] .............................................. B60Q 1/04

[52] U.S. Cl. ...................................... 362/61; 362/293; 362/304; 362/318; 362/802

[58] Field of Search ................... 362/61, 80, 293, 276, 362/297, 300, 302, 303, 346, 802, 318

[56] References Cited

U.S. PATENT DOCUMENTS 4,970,628 11/1990 Bergkvist ........................ 362/293 X
5,029,050 7/1991 Bergkvist ........................ 362/293 X
5,130,904 7/1992 Ohshio et al. .................. 362/293 X
5,169,224 12/1992 Segoshi et al. ................ 362/293 X

*Primary Examiner*—Stephen F. Husar
*Attorney, Agent, or Firm*—Michael J. Striker

[57] ABSTRACT

A headlight for a motor vehicle comprises a gas discharge lamp as a light source emitting visible light and light in UV-wavelength region, a reflector having a first region which reflects the light for forming a low beam and a second region which reflects an additional light beam illuminating a region located beyond a region illuminated by the high beam, a filter arranged in a path of the additional light beam and at least partially absorbing the visible light and at least partially permeable for light in UV-wavelength region. The filter is formed by a coating which covers the second reflector region and is composed of a filtering material.

7 Claims, 1 Drawing Sheet

HEADLIGHT FOR MOTOR VEHICLE

BACKGROUND OF THE INVENTION

The present invention relates to a headlight for motor vehicles.

More particularly, it relates to a headlight which has a light source and a reflector with more than one region.

Headlights of the above mentioned general type are known in the art. One of such headlights is disclosed, for example, in the German reference DE 41 08 001 A1. This headlight has a gas discharge lamp as a light source, which emits both visible light and light in UV-wavelength region. The headlight has further a reflector with a first region which reflects the light of the gas discharge lamp for forming a low beam. The reflector also has a second region which reflects the light for forming from light in UV-wavelength region and an additional light beam which illuminates a region extending beyond the region illuminated by the low beam. A filter is arranged between the gas discharge lamp and the second reflector region and at least partially absorbs the visible light and at the same time is at least partially permeable for light in UV-wavelength region. Due to the additional light beam, a greater region is illuminated than by the low beam. A glare is eliminated since only light in UV-wavelength region illuminates this glare region. Objects of certain materials, for example clothes particles or traffic signs with a coating of fluorescent material are visible brighter in illumination with light in UV-wavelength region, and therefore is earlier recognizable for the vehicle probe. The filter is formed by an additional structural element and therefore requires additional manufacturing expenses for the headlight.

SUMMARY OF THE INVENTION

Accordingly, it is an object of the present invention to provide a headlight which avoids the disadvantages of the prior art.

In keeping with these objects and with others which will become apparent hereinafter, one feature of the present invention resides, briefly stated, in a headlight in which the filter is formed by a coating of the second reflector region with a filtering material.

When the headlight is designed in accordance with the present invention, it has the advantage that for the filter no additional structural element is required.

In accordance with another feature of the present invention, the headlight can produce both in the switching position for low beam an additional light bundle with light in UV-wavelength region, and in the switching position for high beam an additional light beam from visible light so that no additional high beam headlight is needed.

In accordance with a further feature of the present invention, an automatic switching-over between a visible high light beam and a UV-high light beam is possible, depending on the illumination situation in front of the motor vehicle.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
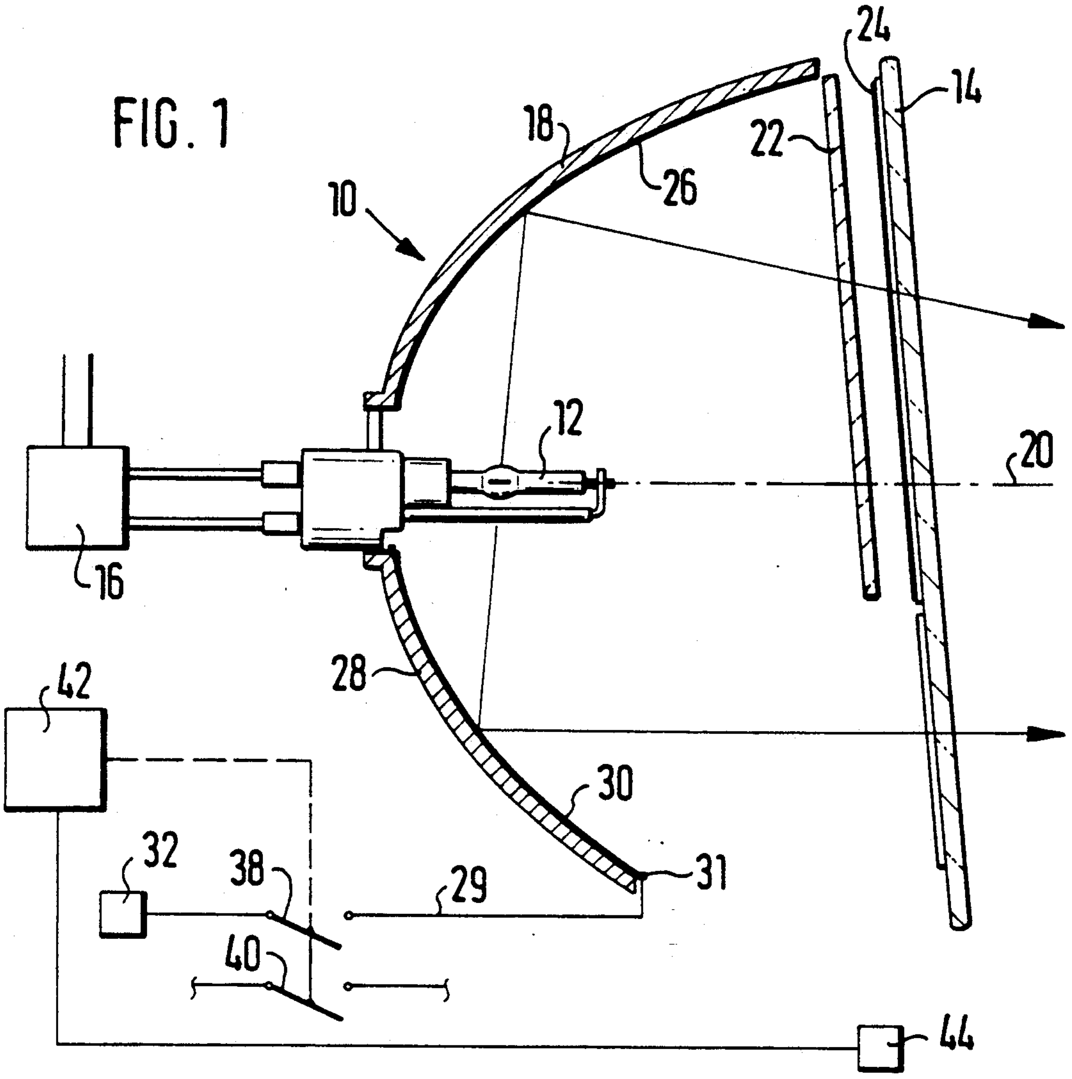
FIG. 1 is a view showing a longitudinal section of a headlight in accordance with the present invention.

A headlight for a motor vehicle shown in FIG. 1 has a reflector 10 and a gas discharge lamp 12 arranged in the region of its apex. The reflector 10 can be also arranged in a not shown housing. The light outlet opening of the headlight is closed with a light disc 14 which can be provided with optically active elements. The gas discharge lamp 12 is connected with pre-switching device 16. The voltage required for operation of the gas discharge lamp is produced from the board voltage of the motor vehicle in the pre-switching device 16. It also has further components for securing a stable operation of the gas discharge lamp. The gas discharge lamp 12 sends visible light and light in UV-wavelength region with high intensity. .

The reflector 10 has a first region 18 which extends in the shown example above the optical axis 20 and is formed so that it reflects visible light for producing a low beam. For this purpose the region 18 can have a suitable shape. For example, it can be composed of different segments, so that by the reflector substantially the low beam is produced with the required light distribution and the light disc 14 has no or only weak-acting optical elements. Alternatively, the upper region 18 can have a simple, for example rotation-parabolic shape, and then the light disc 14 can be provided with optically active elements which create light reflected from the region 18 so that the low beam is produced with the required light distribution.

A filter 22 can be arranged in the beam path of the light which forms the low beam. It at least partially absorbs the light in the UV-wavelength region and is permeable for visible light. Alternatively, the light disc 14, in which the part of the light forming the low beam passes, can be provided with a coating 24 or can have suitable admixtures to impart UV-light absorbing properties and therefore can serve as the filter 22. Preferably, the upper region 18 of the reflector is provided with a filter layer 26 which is permeable for the visible light. It can be applied on reflection layers through which the light is reflected. The filter layer 26 absorbs light in UV-wavelength region at least partially, so that this light cannot be reflected by the region 18 and does not exit the headlight.

The reflector 10 has at least one second region 28 which extends underneath the optical axis 20. The region 28 is provided with a filter coating 30 which at least partially absorbs the visible light and is permeable for the light in UV-wavelength region. Thereby an additional light beam composed substantially only from the light UV-wavelength region is reflected from the lower region 28. The filter coating 30 is composed of electrochromatic material which when being supplied with an electrical voltage absorbs the visible light. Connection element 31 for contacting the filter coating 30 are arranged on the reflector 10. The filter coating is connectable by the connecting element through a conductor 29 with a voltage source 32.

The lower reflector region 28 and the part of the light disc 14 through which this reflecting light passes are designed so that the region which extends beyond the region illuminated with the low beam is illuminated with the additional UV-light beam. The lower region 28 can be, for example, parabolic. The light disc 14 in its lower region can be provided with optically active elements which deviate the UV-light reflected by the lower region in the fashion required for illumination of the desired region.

Figure 2:
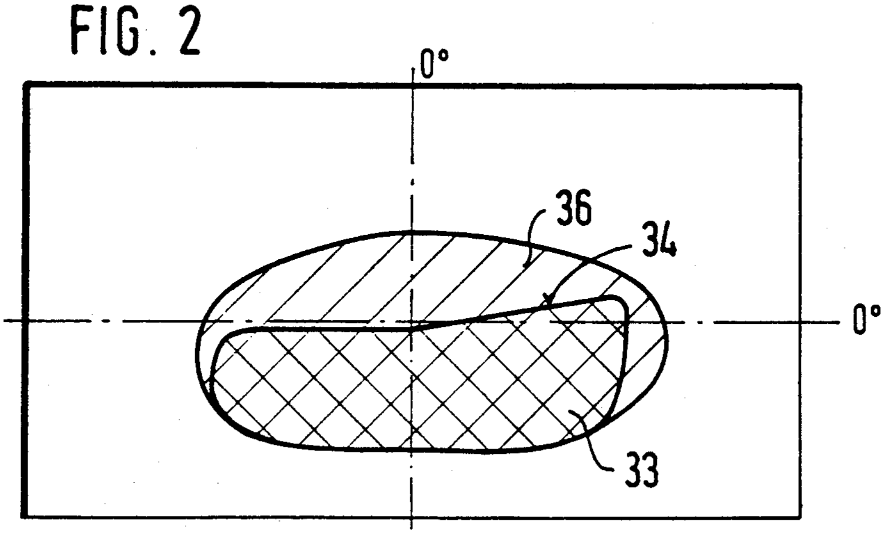
FIG. 2 is a view showing regions illuminated on a measuring screen by different regions of the headlight.

FIG. 2 shows a measuring screen with the reflected visible light of the reflector and the light located in the UV-wavelength region. The measuring screen represents a roadway located in front of the motor vehicle. The region of the measuring screen identified with 33 is illuminated by the upper reflector region 18 with visible light. The region 33 and the light intensity values available in this region at different points correspond to the regulatory requirements for the low beam. The region 33 is limited from above by a bright-dark limit 34. Additionally, a region 36 located outside the region 33 is illuminated with light in UV-wavelength region by the lower reflector region 28. The lower reflector region 28 illuminates the distant region located farther from the vehicle, which would be otherwise illuminated by a high beam headlight. Thereby the vehicle driver can recognize earlier the phenomena occurring in the distant region, such as pedestrians or warning devices when they are provided with a coating composed from the material which is visible during illumination with UV-light.

The reflector regions which form the low beam and the UV high beam can be arranged in reverse order, so that the reflector region which forms the low beam is located under the optical axis 18 and the reflector region which forms the UV high beam is located above the optical axis 18.

In accordance with a further embodiment of the headlight of the present invention, the filter coating 30 is formed so that in currentless condition it at least partially absorbs the light in UV wavelength region and is permeable for the visible light. When an electrical current is applied, the filter coating changes its properties so that it at least partially absorbs the visible light and is permeable for the light in UV wavelength region. A switch 38 is arranged in the conductor 29 between the filter coating 30 and the voltage source 32 and is operated by a light switch 40 of the motor vehicle. In a switching position for the low beam the switch 38 is closed. Therefore, a current is supplied to the filter coating 30 and the additional light beam reflected by the lower reflector region 28 is composed only from the light in UV-wavelength region and cannot lead to a blending. In a switching position for high beam the switch 30 is open. In this position no current is supplied to the filter coating 30, and it is permeable for the visible light and the region 36 on the measuring screen is also illuminated with the visible light.

In accordance with a further embodiment of the headlight, the switch 36 can be actuated by a device 42 which has a sensor 44 detecting the illumination situation in front of the vehicle and in particular the light emitted by oppositely moving vehicles. The signals of the oppositely moving vehicles are evaluated in the device 42. When the device 42 determines the oppositely coming vehicle, the switch 38 is held by the device in the switching position for low beam, or in other words closed. The device 42 does not recognize the oppositely coming vehicle, the device holds the switch 38 in the switching position for high beam or in other words closed. In this construction an automatic switching over between the UV high beam and visible high beam is obtained.

It will be understood that each of the elements described above, or two or more together, may also find a useful application in other types of constructions differing from the types described above.

While the invention has been illustrated and described as embodied in a headlight, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A headlight for a motor vehicle, comprising a gas discharge lamp as a light source emitting visible light and light in UV-wavelength region; a reflector having a first region which reflects the light for forming a low beam and a second region which reflects an additional light beam illuminating a region located beyond a region illuminated by the low beam; a filter arranged in a path of the additional light beam and at least partially absorbing the visible light and at least partially permeable for light in UV-wavelength region, said filter being formed by a coating which covers said second reflector region and is composed of a filtering material.

2. A headlight as defined in claim 1, wherein said filtering material is an electrochromatic material which is switchable over between a condition in which it at least partially absorbs light in UV-wavelength region and a condition in which it is substantially permeable for light in UV-wavelength region, under the action of an electrical voltage.

3. A headlight as defined in claim 2; and further comprising a voltage source; a conductor containing a switch; and a light switch of the motor vehicle, said coating being connected with said voltage source through said conductor which contains said switch, said switch being actuated by said light switch of the motor vehicle.

4. A headlight as defined in claim 2, wherein said coating is bringable in condition in which it is substantially permeable for light in UV-wavelength region by applying an electrical voltage to said coating.

5. A headlight as defined in claim 2, wherein said coating in a condition corresponding to a high beam at least partially absorbs light in UV-wavelength region and is substantially permeable for visible light, and in another condition corresponding to a low beam at least partially absorbs visible light and is substantially permeable for light in UV-wavelength region.

6. A headlight as defined in claim 3; and further comprising a control device provided with a sensor which determines an illumination situation in front of the motor vehicle and evaluates the illumination situation, said control device depending on the illumination situation closing and opening said switch in said conductor from said coating to said voltage source.

7. A headlight as defined in claim 1; and further comprising a filter arranged in a path of the light which forms the low beam and at least partially absorbs the light in UV-wavelength region and is at least partially permeable for visible light.

* * * * *